US009003065B2

(12) United States Patent
Rothstein et al.

(10) Patent No.: US 9,003,065 B2
(45) Date of Patent: *Apr. 7, 2015

(54) DE-DUPLICATING OF PACKETS IN FLOWS AT LAYER 3

(71) Applicant: ExtraHop Networks, Inc., Seattle, WA (US)

(72) Inventors: Jesse Abraham Rothstein, Seattle, WA (US); Arindum Mukerji, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 6 days.

This patent is subject to a terminal disclaimer.

(21) Appl. No.: 14/107,631

(22) Filed: Dec. 16, 2013

(65) Prior Publication Data
US 2014/0280908 A1 Sep. 18, 2014

Related U.S. Application Data

(63) Continuation of application No. 13/831,959, filed on Mar. 15, 2013, now Pat. No. 8,619,579.

(51) Int. Cl.
*H04L 12/26* (2006.01)
*G06F 15/16* (2006.01)
*H04L 12/801* (2013.01)

(52) U.S. Cl.
CPC ............ *H04L 43/04* (2013.01); *G06F 15/16* (2013.01); *H04L 43/14* (2013.01); *H04L 47/10* (2013.01); *H04L 47/15* (2013.01); *H04L 43/106* (2013.01); *H04L 43/022* (2013.01); *H04L 43/026* (2013.01)

(58) Field of Classification Search
CPC ....... G06F 15/16; H04L 43/022; H04L 47/10; H04L 43/04
USPC .......................................... 709/250; 370/235
See application file for complete search history.

(56) References Cited

U.S. PATENT DOCUMENTS

| | | | | |
|---|---|---|---|---|
| 5,430,727 | A * | 7/1995 | Callon | 370/401 |
| 5,787,237 | A * | 7/1998 | Reilly | 358/1.13 |
| 6,401,150 | B1 * | 6/2002 | Reilly | 710/104 |
| 6,765,909 | B1 * | 7/2004 | Sen et al. | 370/392 |
| 7,089,326 | B2 * | 8/2006 | Boucher et al. | 709/242 |

(Continued)

OTHER PUBLICATIONS

Handel et al., "Hiding Data in the OSI Network Model", 1996.*

(Continued)

*Primary Examiner* — O. C. Vostal
(74) *Attorney, Agent, or Firm* — John W. Branch; Lowe Graham Jones PLLC

(57) ABSTRACT

Embodiments are directed towards receiving packets communicated over at least one network, determining layer 3 header information for the received packets, normalizing the determined layer 3 header information for each received packet, employing a determined value based on the normalized layer 3 header information to detect each received packet that is a duplicate, disregarding duplicate packets, and enabling monitoring and analysis of at least selected flows that include packets that are determined to be non-duplicated. Also, if the determined layer 3 header information indicates that the received packet is fragmented, that packet is de-fragmented at least in accordance with a fragment offset. Additionally, normalization may include at least one of masking at least one value in the layer 3 header information, or rolling back changes in the layer 3 header information.

22 Claims, 10 Drawing Sheets

(56) References Cited

U.S. PATENT DOCUMENTS

| | | | |
|---|---|---|---|
| 7,193,968 B1* | 3/2007 | Kapoor et al. | 370/235 |
| 7,313,141 B2 | 12/2007 | Kan et al. | |
| 7,454,499 B2* | 11/2008 | Cantrell et al. | 709/225 |
| 7,480,292 B2 | 1/2009 | Busi et al. | |
| 7,602,731 B2* | 10/2009 | Jain | 370/252 |
| 8,411,677 B1* | 4/2013 | Colloff | 370/389 |
| 8,619,579 B1* | 12/2013 | Rothstein et al. | 370/235 |
| 2002/0024964 A1* | 2/2002 | Baum et al. | 370/419 |
| 2002/0080720 A1* | 6/2002 | Pegrum et al. | 370/236 |
| 2002/0091844 A1* | 7/2002 | Craft et al. | 709/230 |
| 2004/0003094 A1* | 1/2004 | See | 709/227 |
| 2004/0093513 A1* | 5/2004 | Cantrell et al. | 713/201 |
| 2004/0250059 A1* | 12/2004 | Ramelson et al. | 713/150 |
| 2005/0060427 A1* | 3/2005 | Phillips et al. | 709/238 |
| 2005/0091357 A1* | 4/2005 | Krantz et al. | 709/223 |
| 2007/0156919 A1* | 7/2007 | Potti et al. | 709/238 |
| 2008/0062995 A1* | 3/2008 | Kaas et al. | 370/392 |
| 2008/0130659 A1* | 6/2008 | Polland | 370/395.52 |
| 2008/0141275 A1* | 6/2008 | Borgendale et al. | 719/313 |
| 2009/0225675 A1 | 9/2009 | Baum et al. | |
| 2009/0245083 A1* | 10/2009 | Hamzeh | 370/204 |
| 2011/0280149 A1 | 11/2011 | Okada et al. | |
| 2012/0176917 A1 | 7/2012 | Matityahu et al. | |
| 2012/0243533 A1* | 9/2012 | Leong | 370/389 |
| 2012/0294305 A1* | 11/2012 | Rose et al. | 370/355 |
| 2013/0061036 A1* | 3/2013 | Oliver | 713/150 |
| 2013/0103734 A1* | 4/2013 | Boldyrev et al. | 709/201 |
| 2013/0232104 A1* | 9/2013 | Goyal et al. | 706/59 |

OTHER PUBLICATIONS

Handley et al., "Network Intrusion Detection: Evasion, Traffic Normalization, and End-to-End Protocol Semantics", 2011.*

Information Sciences Institute, "Internet Protocol DARPA Internet Program Protocol Specification", RFC 791, 1981.*

Fuertes, "Evaluation of OSPF Extensions in MANET Routing", 2007.*

Parsons, "Moving Across the Internet: Code-Bodeis, Code-Corpses, and Network Architecture", 2010.*

Zander et al., "Covert Channels and Communications in Computer Network Protocols", 2007.*

Official Communication for U.S. Appl. No. 13/831,959 mailed Aug. 22, 2013.

* cited by examiner

DE-DUPLICATING OF PACKETS IN FLOWS AT LAYER 3

CROSS-REFERENCE TO RELATED APPLICATIONS

The present application is a Continuation of U.S. application Ser. No. 13/831,959 filed Mar. 15, 2013, entitled "DE-DUPLICATING OF PACKETS IN FLOWS AT LAYER 3," the benefit of the earlier filing date of which is hereby claimed under 35 U.S.C. §120 and 37 C.F.R. §1.78, and which is further incorporated by reference.

TECHNICAL FIELD

The present invention relates generally to network monitoring, and more particularly, but not exclusively, to determining duplicated packets in flows monitored over a network.

BACKGROUND

On most computer networks, bits of data arranged in bytes are packaged into collections of bytes called packets. These packets are generally communicated between computing devices over networks in a wired and/or wireless manner. A suite of communication protocols are typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7).

Another model for a network communication protocol stack is the Internet Protocol (IP) model, which is also known as the Transport Communication Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. Additionally, the HTTP protocol is listed on the seventh layer of the OSI model and on the fourth layer of the TCP/IP model.

To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. In other instances, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In still other instances packet copies may be provided to the network monitors from a specialized network tap.

In some instances, a network monitor may operate as a proxy that is actively arranged between two endpoints, such as a client device and a server device. A network monitor proxy intercepts each packet sent by each endpoint and retransmits or forwards each intercepted packet to the other endpoint. Since network monitor proxies actively monitor network packets, they often enable a variety of additional services such as caching, content filtering, and access control.

Furthermore as information technology infrastructure becomes more complex and more dynamic it may be more difficult to determine and monitor which devices and applications may operative on a network. Also, the complexity may make it difficult, especially in large networks, for determining dependencies among the network devices and applications in the operative on the networks.

To monitor flows of packets, the traffic may be tapped off a port mirror or SPAN for one switch or a redundant stack of switches. Monitored traffic may be aggregated from multiple tap points using multiple network taps, an aggregation tap, SPAN aggregator, or the like. Also, the sequence of packets that are provided by the port mirror may span one or more Virtual Local Area Networks (VLANs), individual ports, and/or multiple ports. Consequently, the sheer volume of packets that are regularly communicated over multiple VLANS having a plurality of intermediate network devices, such as switches, routers, and the like, has made it relatively common for network monitors to receive duplicate packets or multiple versions of the same packet at different hops in monitored flows. Processing such duplicate packets is inefficient. It is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified.

For a better understanding of the present invention, reference will be made to the following description of the various embodiments, which is to be read in association with the accompanying drawings, wherein.

DESCRIPTION OF THE VARIOUS EMBODIMENTS

Figure 1:
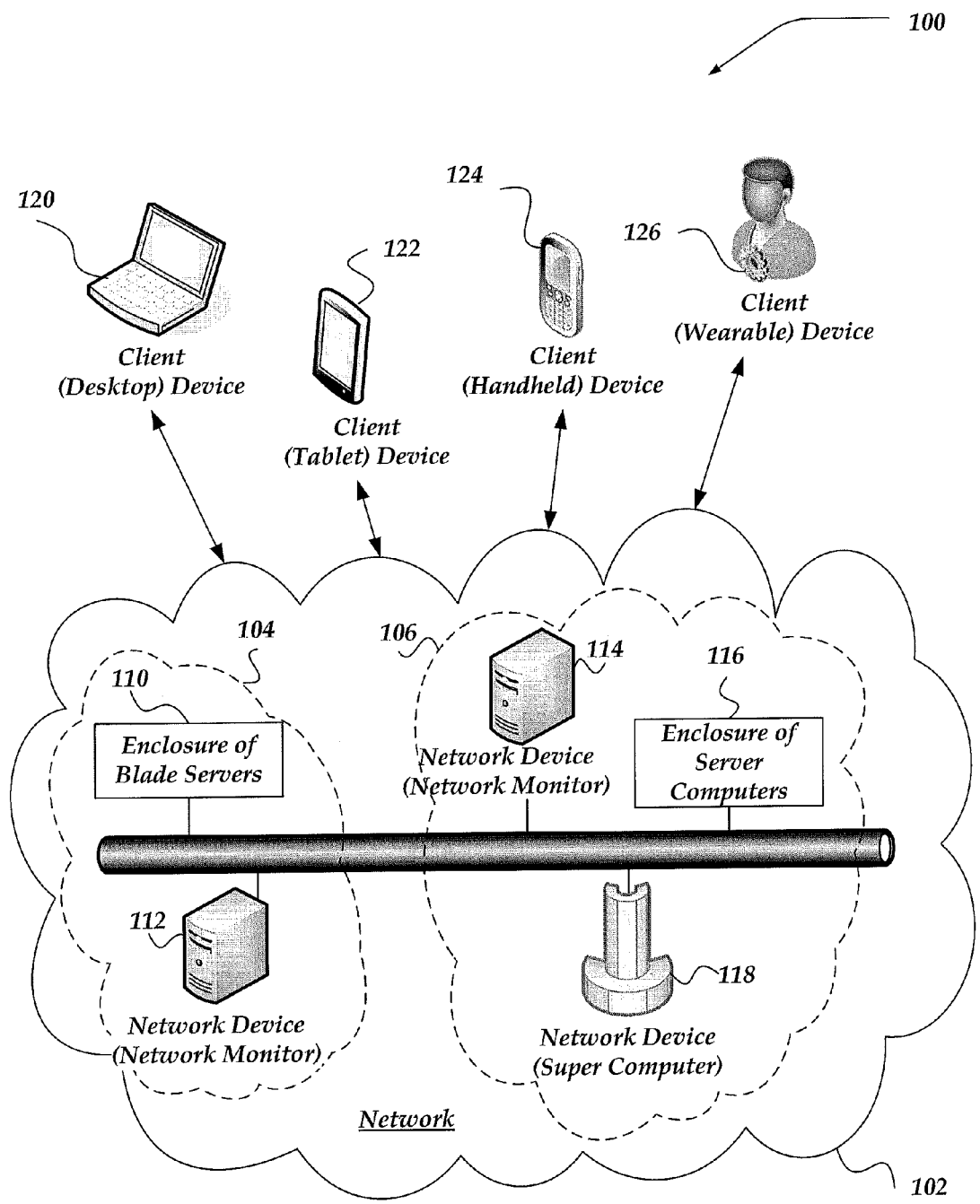
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection oriented communication. A session also is the basic step to transmit in connectionless communication modes.

As used herein, the term "connection" refers to a communication session with a semi-permanent connection for interactive packet interchange between two or more communicating endpoints, such as network devices. The connection is established before any useful data is transferred, and where a stream of data is delivered in the same order as it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths.

Connection oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "flow" refer to one packet or a stream of packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with a handshake and creates a single bi-directional flow between two endpoints, e.g., one direction of the flow going from endpoint A to endpoint B, the other direction of the flow going from endpoint B to endpoint A, where endpoint A and endpoint B are IP-Port source and destinations. In at least one of the various embodiments, a tuple may be employed to identify a flow. The tuple may include other attributes such as VLAN, IP protocol, and the like. Also, other protocols may establish a separate flow for control information that enables management of at least one or more flows between two or more endpoints.

As used herein, the terms "network monitor", "network monitor device", or "NMD" refer to an application (software, hardware, or some combination) that is arranged to monitor and record flows of packets in a session that are communicated between at least two endpoints over at least one network. The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from and to end points such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. The NMD may attempt to classify the network traffic according to communication protocols that are used. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, TDS, TCP, IP, and the like.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicate data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer include FTP, HTTP, and Telnet.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "discovered device" refers to devices that have been detected and identified as operating on one or more of the networks being monitored by a NMD. The NMD may determine that a device is discovered if it detects a network packet that has been unequivocally emitted by that device. In most cases, the NMD may use the MAC address and VLAN of the detected device as its identifier. In at least one of the various embodiments, the NMD may be configured to ignore certain network devices so not every network device operative on the monitored networks may be recognized as a discovered device.

As used herein, the terms "application transactional streams," "application transaction," and "transaction" refer to an application level transmission over the network that may be broken up into multiple network packets. For example, if the size of a transaction exceeds the Maximum Transmission Unit (MTU) for a network it will be broken up into smaller network packets for transmission over the network and reassembled after it reaches its destination. In at least one of the various embodiments, the NMD may reassemble one or more network packets into a transaction before performing additional analysis.

As used herein, the term "device profile" refers to the properties, characteristics and relationships for a discovered device that may have been detected by the NMD. Device profiles may include information, such as, vender, roles, applications, dependencies, MAC addresses, OSI Layer 3 address information (IP addresses associated with device), or the like. A device profile may be used to collect the information the NMD discovers about a device. In at least one of the various embodiments, device profiles may be arranged into explicit data structures or they may be implicit abstractions of the properties and characteristics of discovered devices.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, the various embodiments are directed towards receiving packets communicated over at least one network, determining layer 2-3 header information for the received packets, normalizing the determined layer 2-3 header information for each received packet, employing a determined value based on the normalized layer 2-3 header information to detect each received packet that is a duplicate, separately processing duplicate packets from non-duplicative packets, and enabling monitoring and analysis of at least selected flows that include packets that are determined to be non-duplicative.

In at least one of the various embodiments, separate processing of a duplicate packet may include at least one of counting the duplicate packet, tagging the duplicate packet, monitoring and/or analyzing the duplicate packet at a lower priority than a non-duplicative packet, and disregarding the duplicate packet.

In at least one of the various embodiments, if the determined layer 3 header information indicates that the received packet is fragmented, that packet is de-fragmented or reassembled at least in accordance with a fragment offset. The defragmented packet is subsequently processed and discussed herein as other received packets.

In at least one of the various embodiments, the layer 2-3 header information may be normalized by masking values that are changed by one or more intermediate network devices. For example, normalization may entail providing a bit mask to block, ignore, or otherwise skip over at least one of the destination Media Access Control (MAC) address, the source MAC address, time-to-live value, and header checksum value in the layer 2 and layer 3 headers. In at least one of the various embodiments, the normalized (masked) layer 2-3 header information may be hashed along with at least one of the layer 3 payload, or the layer 4 header of the packet into a hash value by a message digest (MD) or strong hashing algorithm, including but not limited to MD5, SHA-256, or CRC32. In this way, a comparison of the hash value and another hash value along with the corresponding packet lengths may be employed to determine if there is a strong probability that a received packet is a duplicate of a previously received packet. Further, the hash value may be compared to other hash values generated for other received packets. Also, each packet having a hash value that is equivalent to a previously received packet is identified as duplicative and separately processed from monitoring non-duplicative packets.

In at least one of the various embodiments, the layer 2-3 header information may also be normalized by rolling back changes in values that were modified in the layer 2 and layer 3 headers by one or more intermediate network devices. For example, a time-to-live value may be incremented or decremented to compensate for changes made by at least one intermediate device that has forwarded an outbound packet. For a received packet that is determined to have been outbound from the intermediate device, changes in the layer 3 header information, such as incrementing or decrementing the TTL value, may be rolled back to what it would have been if it had been inbound to the intermediate network device. Another checksum value is recalculated for the received outbound packet based in part on its rolled back change (such as rolled back TTL value) in the layer 2-3 header information. In at least one of the various embodiments, the normalized (rolled back TTL and recalculated IP header checksum values) layer 3 header information for a received packet and may be at least one of a portion of a layer 3 payload and a portion of a layer 4 header is processed into a hash value. Even if a received packet's layer 3 header information is not determined to have been changed by an intermediate device (and thus not normalized), it is still hashed into another hash value for subsequent comparison to other hash values. In at least one of the various embodiments, the hashing may be performed by a message digest (MD) or strong hashing algorithm, including but not limited to MD5, SHA-256, or CRC32 on the normalized layer 2-3 header information and subsequent packet payload.

Also, optionally in at least one of the various embodiments, if the hash value of the received packet is a duplicate of another hash value for a previously received packet and the lengths of the packets are the same, the received packet is identified as duplicative and may be separately processed for analysis. In at least one of the various embodiments, analysis of one or more aspects of the at least one monitored flow may include statistics, metrics, quality of service, application-level (OSI model layer 7) transaction monitoring, and the like.

In at least one of the various embodiments, one or more flows of packets over the network may be selected for monitoring by an administrator of the network or an automated process based on different factors. For example, flows may be selected for monitoring that correspond to an application, node, network device, or the like, that is communicating over the network. Further, related flows may be identified and selected for monitoring, e.g., one or more flows that correspond to a selected application, node, network device, or the like.

In at least one embodiment, a display may be provided for displaying information regarding one or more packets and/or information regarding the monitored d flow. In at least one embodiment, analysis may be performed on the monitored flow, which may include statistics, reports, or the like. In at least one embodiment, the analysis may be provided to a separate application for subsequent processing.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include module, processes, components, services, or the like, and which are operative to perform as a Network Monitor Device (NMD). These NMDs are arranged to monitor and record flows of packets in a session that are communicated between at least two endpoints over at least one network. These NMDs can provide information for assessing different aspects of these monitored flows. In at least one embodiment, the NMDs passively monitor network packet traffic without participating in the communication protocols. Both network devices 112 and 114 are arranged to operate as NMDs that may perform actions as further described in conjunction with at least the figures beginning at FIG. 6.

Also, in at least one of the various embodiments, enclosure of blade servers 110, enclosure of enclosure of server computers 116, super computer network device 118 may include network devices that perform the actions of NMDs. In at least one embodiment, at least one blade server or at least one server computer may be arranged to also operate as an NMD.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G), $6^{th}$ (6G), generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
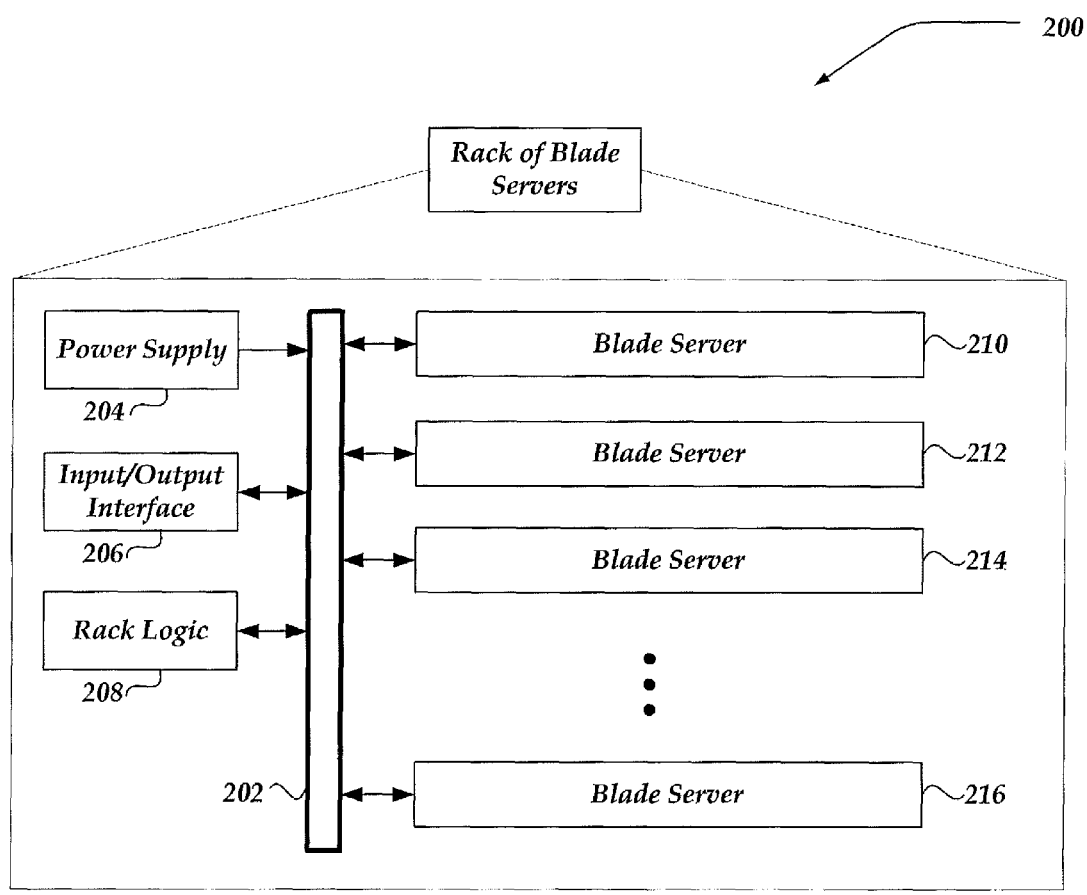
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and backplane 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
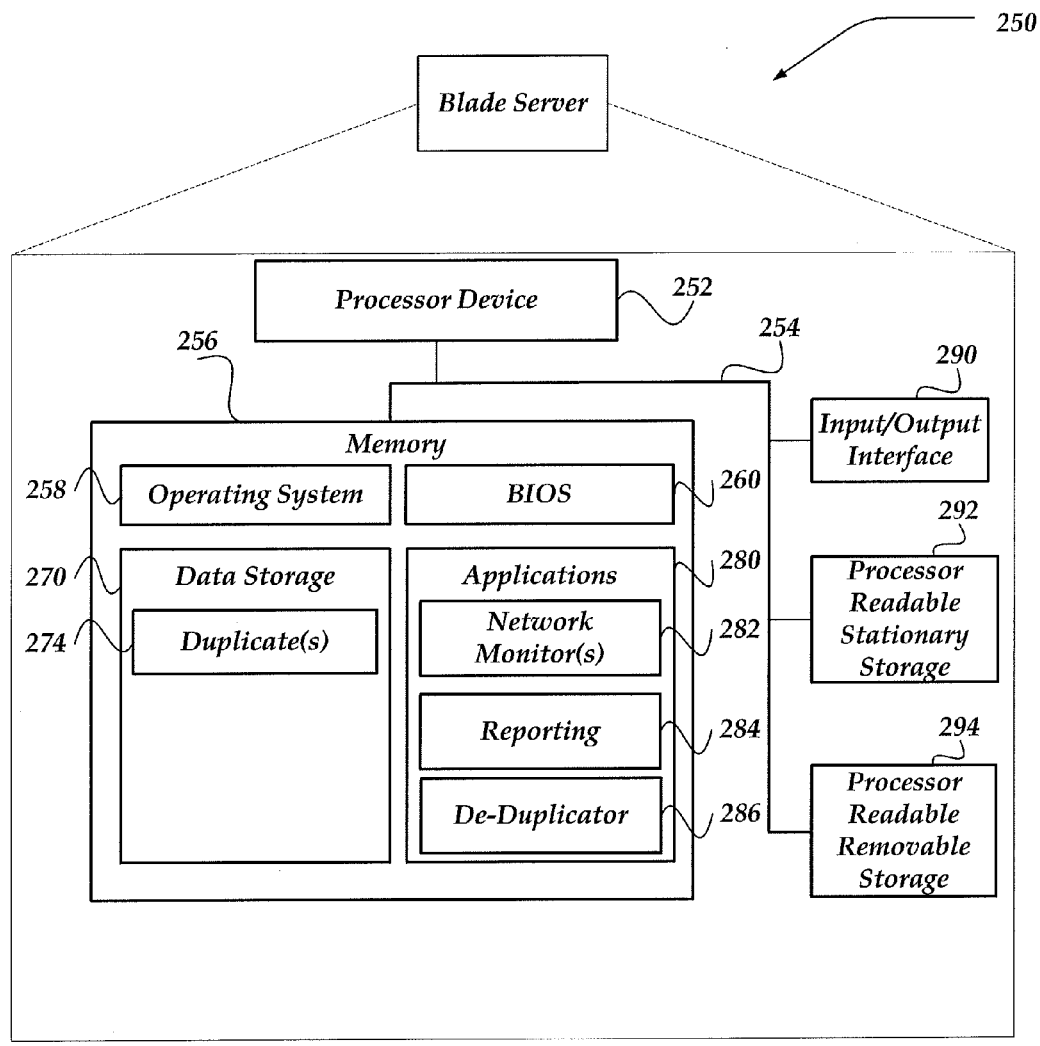
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-9. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, Duplicates 274, or the like. Duplicates 274 may contain packets that are compared to other packets to identify duplicate packets that are monitored on the network.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Network Monitor(s) 282, Reporting application 284, and De-duplicator 286, which may be enabled to perform actions further described below starting with at least FIG. 6. Briefly, de-duplicator 286 normalizes layer 3 information in packets. The normalized layer 3 information is compared to identify duplicate packets in the monitored flow. Duplicate packets are subsequently disregarded for future analysis of the monitored flows of packets.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, network monitor application 282, De-duplicator 286, and reporting application 284 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment. Likewise, in at least one of the various embodiments, virtual machines and/or virtual servers dedicated to running network monitor application 282, de-duplicator application 286, and reporting application 284 may be provisioned and de-commissioned automatically.

Also, in at least one of the various embodiments, Duplicate(s) 274, or the like, may be located on virtual servers running in a cloud-based computing environment rather than being tied to one or more specific physical blade servers.

Illustrative Client Device

Figure 3:
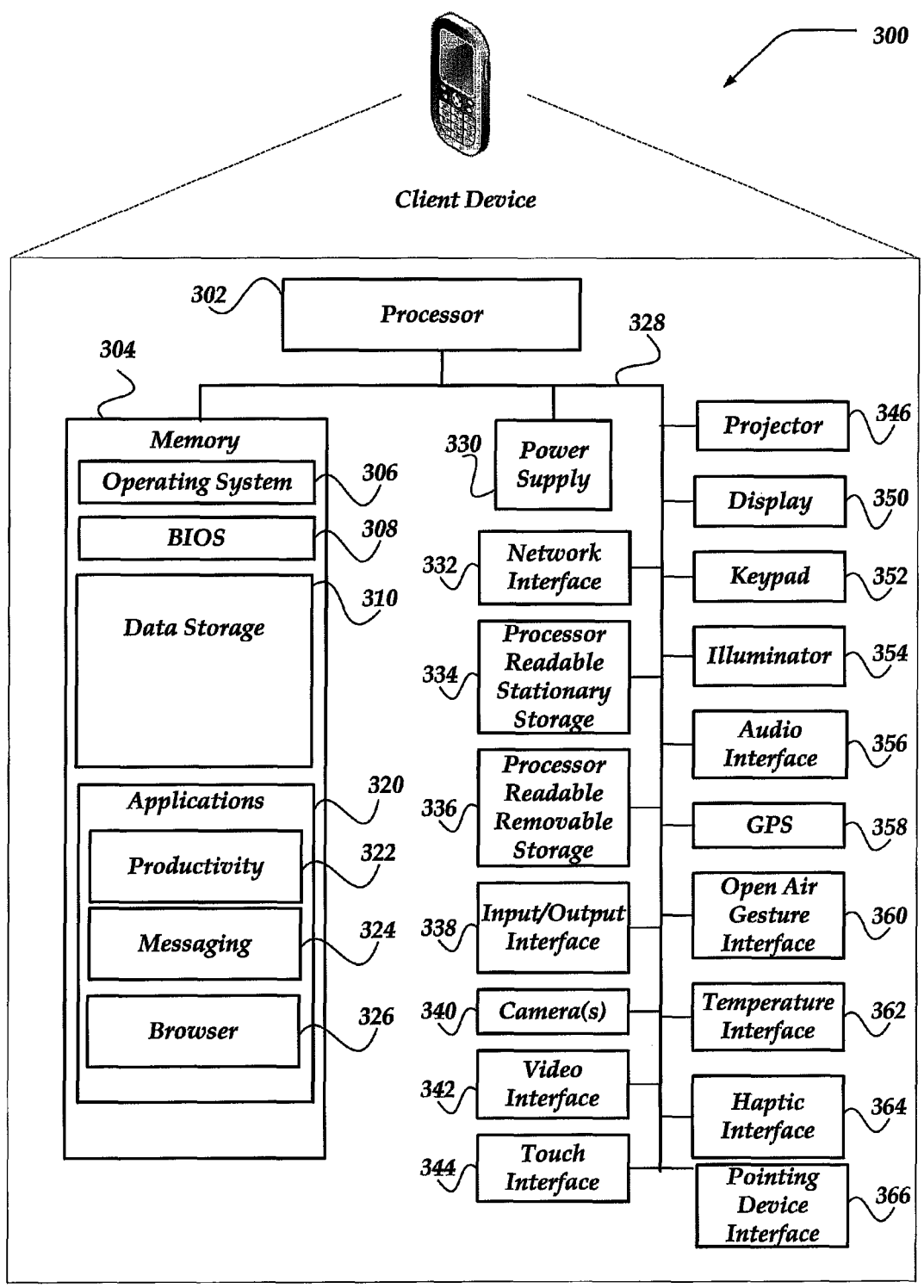
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAT), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, productivity application 322. In at least one of the various embodiments, productivity application 322, messaging application 324, and browser application 326 may be used to communicate with blade servers 110, server computers 116 and/or Supercomputer 118, and/or cloud code device 112, including, but not limited to, queries, searches, API calls, content, data, messages, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
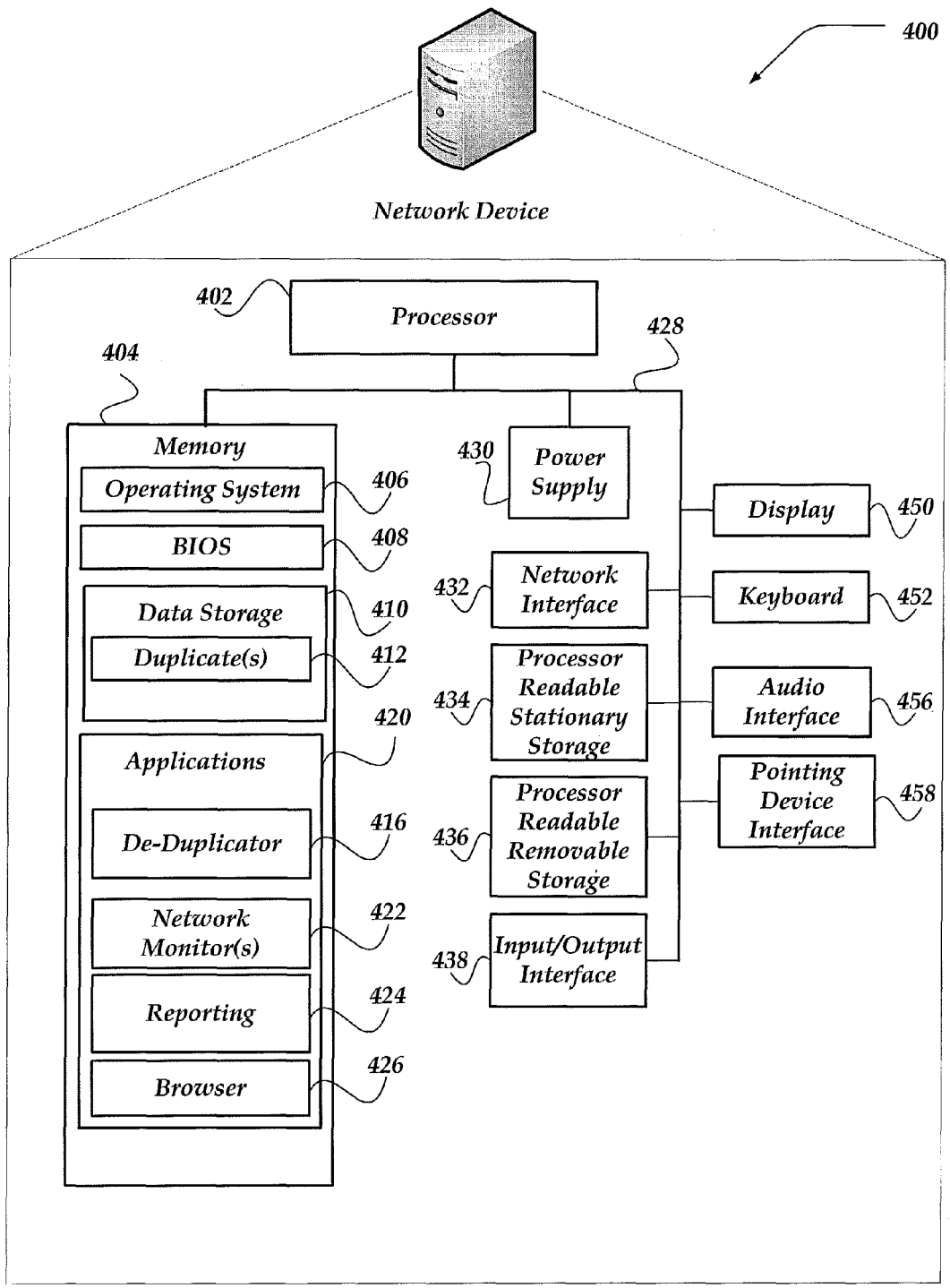
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, network interface card (NIC), or the like. Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-9. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, Duplicate(s) 412, which are packets that were determined to be duplicates of other monitored packets.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include Network Monitor application 422, Reporting application 424, and Browser application 426, and De-duplicator 416 which may be enabled to perform actions further described below starting with at least FIG. 6. In at least one of the various embodiments, while they may be illustrated here as separate applications, De-duplicator 416, Network Monitor application 422 and/or Reporting application 424 may be implemented as modules and/or components of the same application. Further, in at least one of the various embodiments, De-duplicator 416, Network Monitor application 422 and/or Reporting application 424 may be implemented as operating system extensions, modules, plugins, or the like.

Furthermore, in at least one of the various embodiments, D-Duplicator 416, Network Monitor application 422 and Reporting application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running De-Duplicator 416, Network Monitor application 422 and/or Reporting application 424 may be provisioned and de-commissioned automatically.

Also, in at least one of the various embodiments, Duplicate(s) 412, or the like, may located in virtual servers running in a cloud-based computing environment rather than being tied to one or more specific physical blade servers or server computer devices.

Illustrative Passive Configuration of Network Monitor Device

Figure 5:
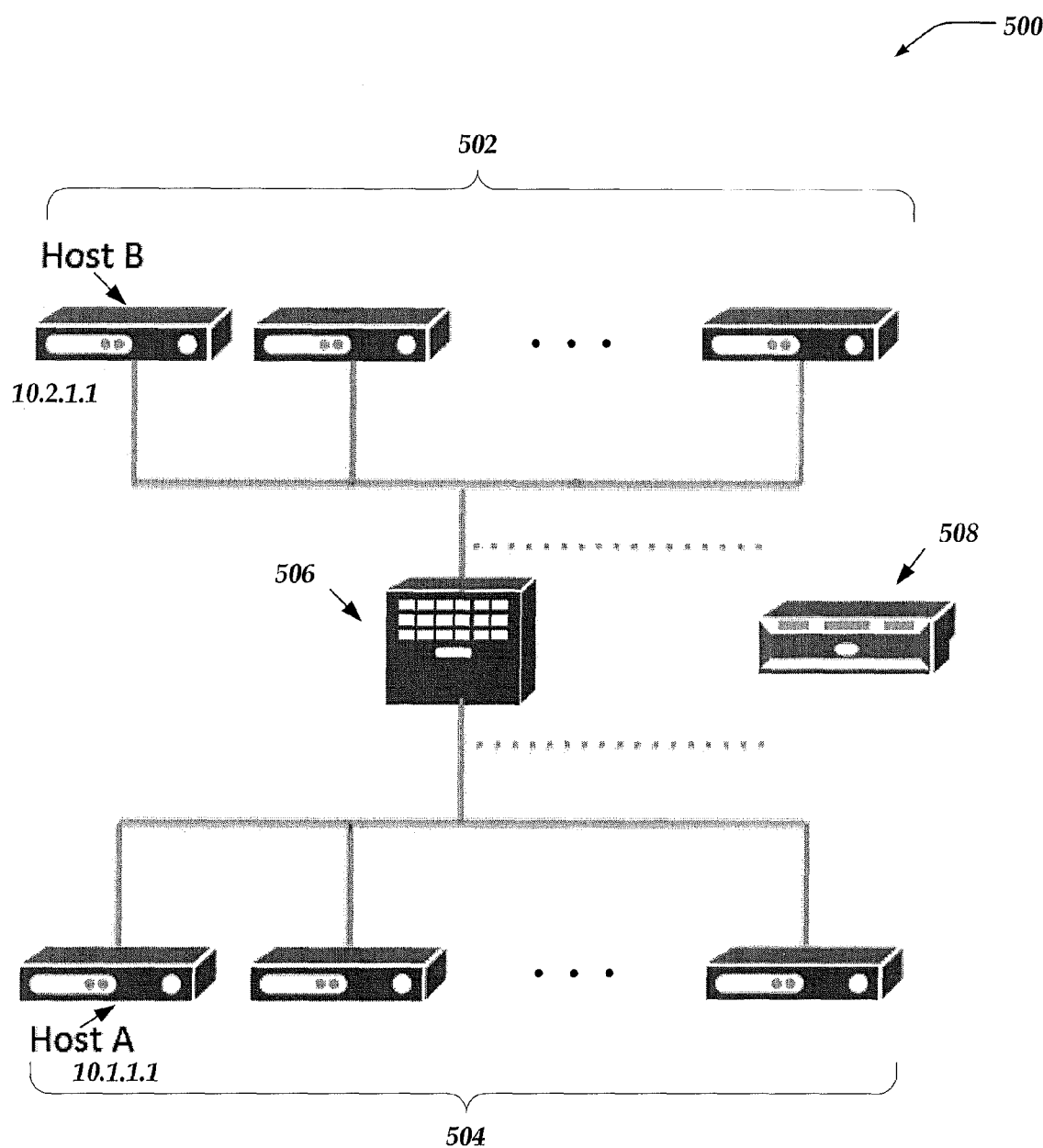
FIG. 5 shows an exemplary system for at least one embodiment.

FIG. 5 shows one embodiment of system 500 that includes a plurality of network devices on first network 502 and a plurality of network devices on second network 504. Communication between the first network and the second network is managed by router 506, which is a type of intermediate network device. Also, NMD 508 is arranged to passively monitor and record packets that are communicated in flows between a network device on first network 502 and second network 504. For example, the communication of flows of packets between the Host B network device and the Host A network device are managed by router 506 and NMD 508 is operative to passively monitor and record these flows.

NMD 508 can receive network communication for monitoring through a variety of means including network taps, wireless receivers, port mirrors or directed tunnels from network switches, servers including the endpoints themselves, or other infrastructure devices such as routers. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. A port mirror can be arranged for one switch or a redundant stack of switches. Also, the span of packets that are provided by the port mirror may cover one or more Virtual Local Area Networks (VLANs), individual ports, and/or multiple ports.

In at least one of the various embodiments, an intermediate network device such as router 506 may translate destination Media Access Control (MAC) addresses into other destination MAC addresses as they are forwarded from one network to another. For example, as shown, Host A on network 504 and Host B on network 502 can communicate a flow of packets through router 506. However, when Host A sends a packet to the destination IP address corresponding to Host B (i.e. 10.1.1.1) through router 506, the router will translate the destination MAC address to the MAC address corresponding to the Host B end station. Also, router 506 may change other packet header information for packets that are communicated between Host A and Host B. For example, this intermediate network device may decrement a time-to-live (TTL) value for a packet's IP header and may also update its IP header checksum to accommodate changes to at least the TTL. Additionally, this intermediate network device may apply a different ToS value, DiffServ value, or signal Explicit Congestion Notification (ECN). The intermediate network device may also change the layer 2 MAC addresses, VLAN id, or fragment the packet.

Also, it is noteworthy that since NMD 508 is monitoring packet flows for interfaces of router 506 that span two networks, packets communicated between the networks can still be somewhat different from each other even if the addresses are not translated. However, the various embodiments can identify even these packets that are duplicative based on an evaluation of normalized packet header information at the OSI model layers 2-3. Additionally, although not shown, the NMD may be arranged to monitor packets across a plurality of intermediate network devices (such as switches, routers, load balancers, and the like), a plurality of network tap connections, and/or a plurality of port mirrors.

Generalized Operation

Figure 6:
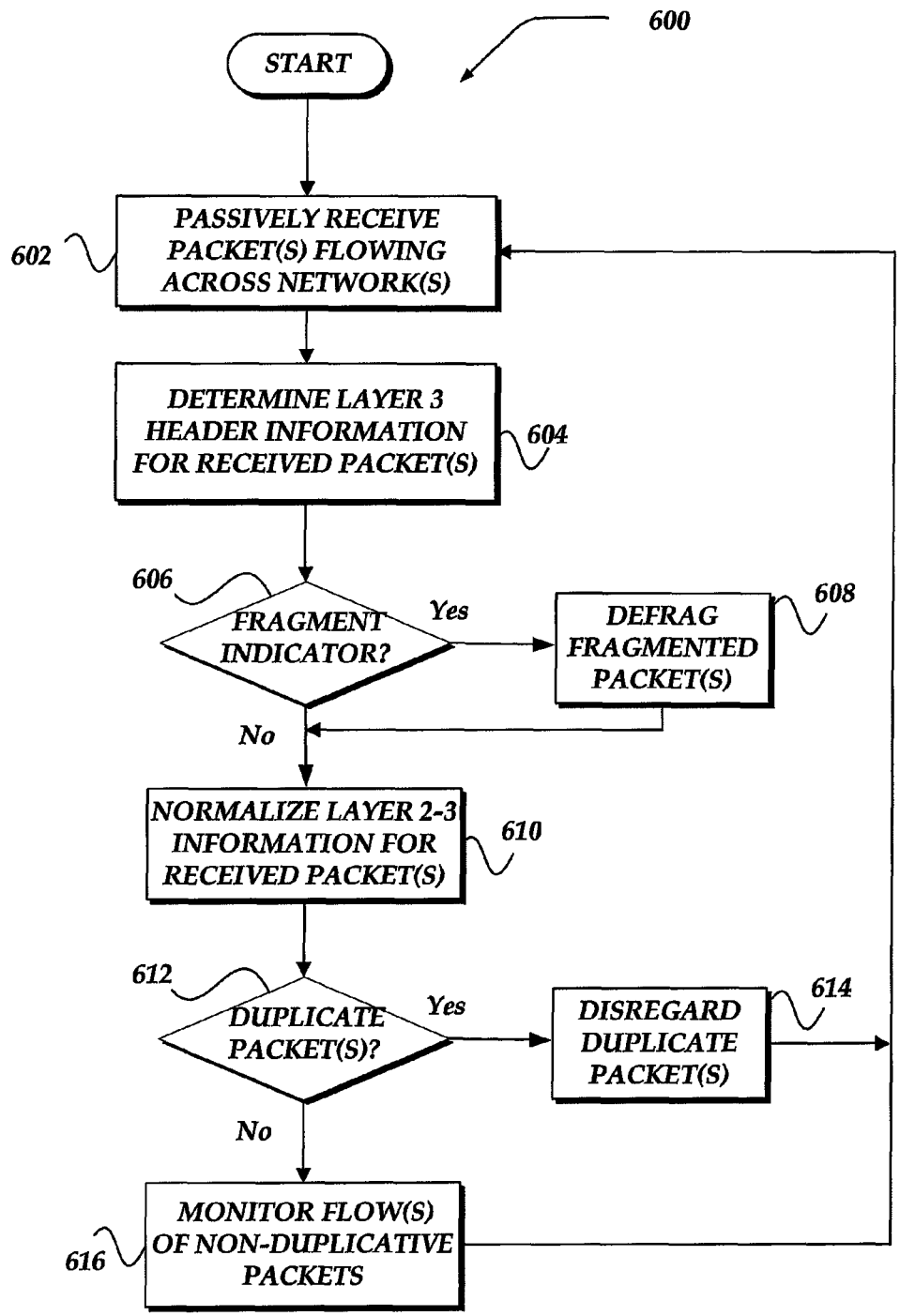
FIG. 6 illustrates a flowchart for one embodiment of a process for determining duplicate received packets and monitoring of flows of non-duplicate packets.

FIG. 6 illustrates a flowchart of exemplary process 600 for determining duplicative received packets that are subsequently disregarded, and providing monitoring and analysis for flows of packets that are determined to be non-duplicative. Moving from a start block, the process advances to block 602 where flows of packets are passively received by a network monitoring device such as an NMD. Stepping to block 604, the process determines the OSI model layer 3 header information corresponding to a received packet. At decision block 606, a determination is made if the header information includes a fragment offset or "more fragments" flag which indicates that the received packet is a fragmented. If true, at block 608 the fragmented packet is reassembled at least in accordance with the fragment offset. The process flows to block 610, where the layer 2-3 header information is normalized for the received packets. Also, if the determination at decision block 606, was false, the process would advance directly to block 610.

At block 610, layer 3 header information is normalized for subsequent evaluation of duplication in another received packet. The normalization may modify and/or block layer 2-3 header information that was changed by an intermediate network device. For example, an intermediate network device may decrement the time-to-live value in the layer 3 header and update the IP header checksum of a packet that is changed by at least one intermediate network device that communicates the received packet over one or more networks. Additionally, at least FIGS. 7 and 8 provide more detailed descriptions of various embodiments that may be employed to normalize the layer 2-3 header information of received packets and detect duplicative packets.

At decision block 612, a determination is made as to whether the received packet is a duplicate of another previously received packet. If true, the process moves to block 614 and each packet that is identified as duplicative is separately processed for a non-duplicative received packet. The process then returns to block 602 and resumes performing substantially the same actions as disclosed above. Alternatively, if the determination of decision block 612 is false, the process flows to block 616 where the non-duplicative packet is employed for at least one of real time monitoring and/or non-real time monitoring of at least one flow that corresponds to the non-duplicative packet. Also, in at least one of the various embodiments, analysis of one or more aspects of the at least one monitored flow may be performed, e.g., statistics, metrics, quality of service, and the like.

Figure 7:
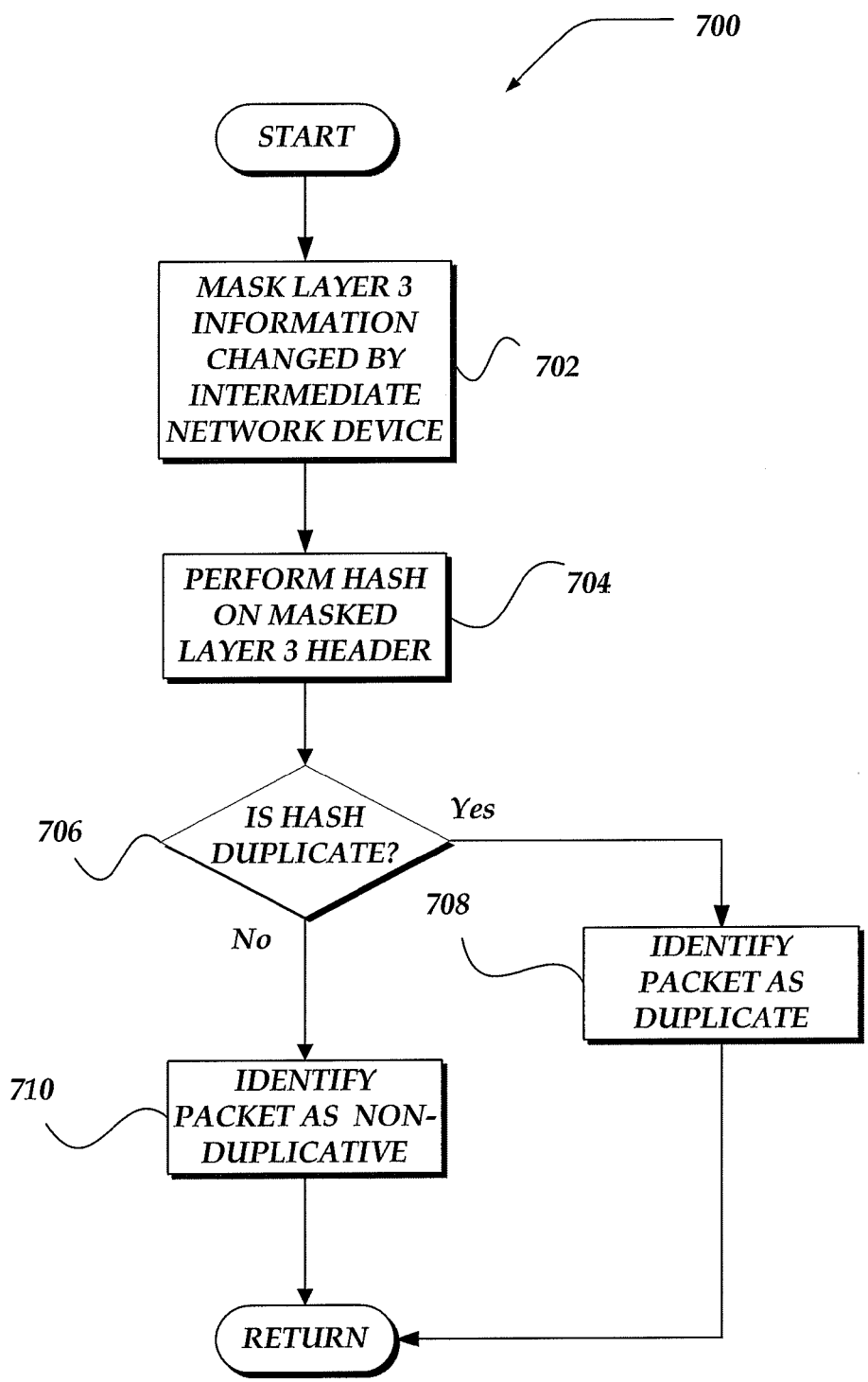
FIG. 7 shows a flowchart for one embodiment of a process for normalizing layer 3 packet information with a mask.
Figure 8:
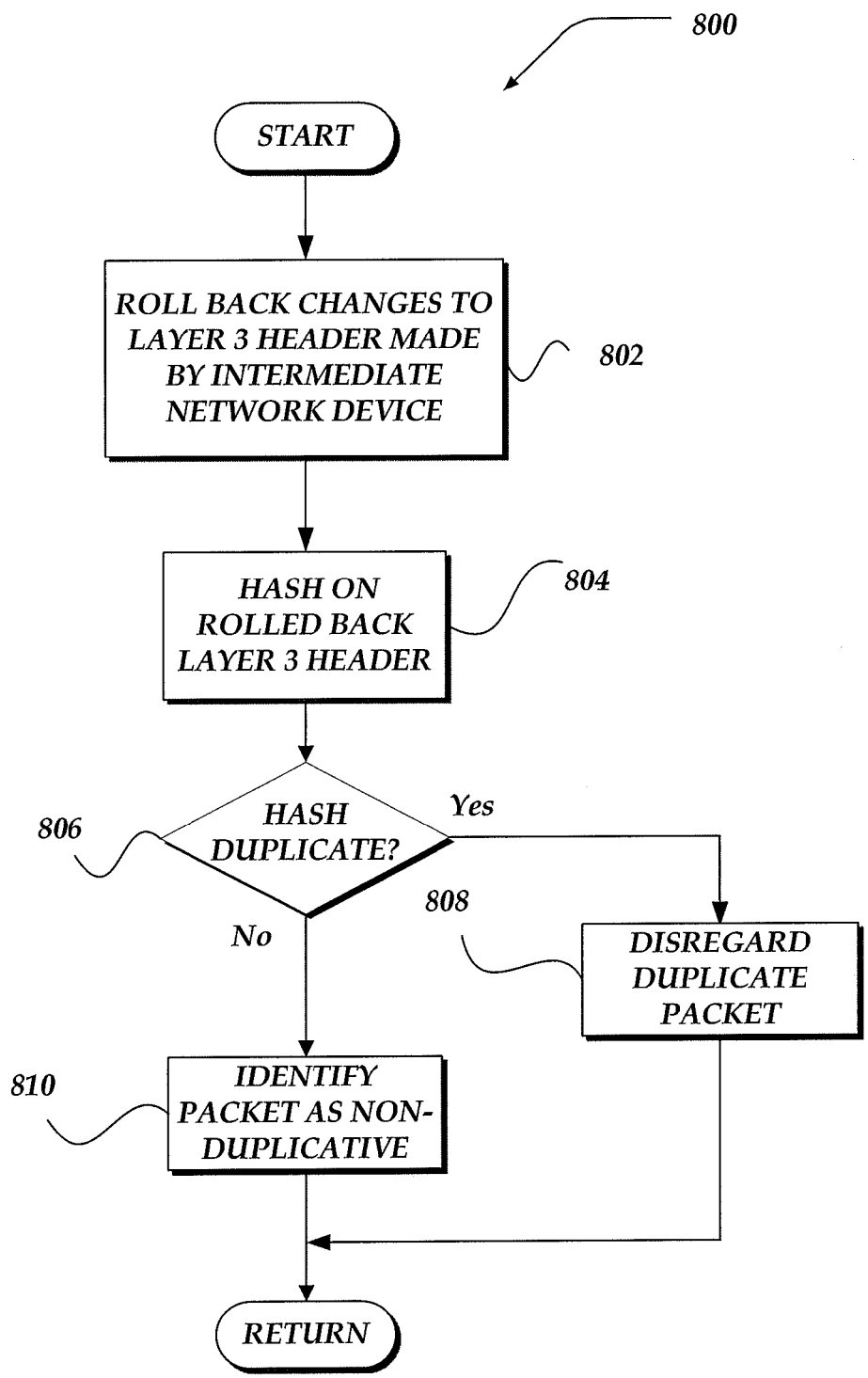
FIG. 8 shows a flowchart for one embodiment of a process for normalizing layer 3 packet information by rolling back changed information.

FIG. 7 illustrates an exemplary flowchart of process 700 for normalizing OSI layer 3 header information, and identifying duplicative packets from a comparison of determined values based on the normalized information. Moving from a start block, the process advances to block 702 where layer 3 header information that was previously changed by an intermediate network device is identified and masked, e.g., a bit mask is provided for a time-to-live value and/or a checksum value in the header information.

At block 704, a hash value is determined based on the normalized (masked) layer 3 header information of the received packet, and at least one of a portion of a layer 3 payload of the received packet or a portion of a layer 4 header of the received packet. In at least one embodiment, the hash may be determined by a message digest (MD) or strong hashing algorithm, including but not limited to MD5, SHA-256, or CRC32 that is performed on the normalized layer 3 header information and some amount of L3 packet payload. Stepping to decision block 706, a determination is made as to whether the determined hash value is a duplicate of another hash value that was determined for a previously received packet in substantially the same manner as the received packet's hash value. If affirmative, the process moves to block 708 where the packet is identified as a duplicate and processed separately from a non-duplicative received packet by the NMD. However, if the determination at decision block 706 is negative, the process moves to block 710 where the packet is identified as non-duplicative. The non-duplicative packet is subsequently employed for real time and/or non-real time monitoring of at least one flow that corresponds to the non-duplicative packet. Also, in at least one of the various embodiments, analysis of one or more aspects of the at least one monitored flow may be performed, e.g., statistics, metrics, quality of service, and the like. Next, the process returns to performing other actions.

FIG. 8 illustrates an exemplary flowchart of yet another process 800 for normalizing OSI layer 3 header information, and identifying duplicative packets from a comparison of determined values based on the normalized information. Moving from a start block, the process advances to block 802 where a received packet's layer 3 header information that was previously changed by an intermediate network device is identified. In at least one of the various embodiments, the layer 3 header information may be normalized by rolling back changes in values that were determined to be modified in the layer 3 header information by one or more intermediate network devices. For example, a TTL value may be modified by incrementing or decrementing it to compensate for changes made by at least one intermediate device to an outbound packet to what it would have been if it was inbound to the intermediate network device. Also, a new IP header checksum value may be calculated to accommodate the rolled back TTL value.

At block 804, the normalized layer 3 header information for a received packet is processed into a hash value. Even if a received packet's layer 3 header information is not determined to have been changed by an intermediate device (and thus not normalized), it is still hashed into another hash value for subsequent comparison to other hash values. In at least one of the various embodiments, the hashing may be performed by a message digest (MD) or strong hashing algorithm, including but not limited to MD5, SHA-256, or CRC32 on the normalized layer 3 header information and some amount of the payload. Also, in at least one of the various embodiments, the hash values may be substantially based on at least one of information included at OSI model layers 2, 3, and 4 as discussed in greater detail above for FIG. 7.

At decision block 806, a determination is made as to whether the hash value of the received packet is a duplicate of another hash value for a previously received packet. If affirmative, the process moves to block 808 where the received packet having the hash value that is equivalent to a previously received packet is identified as duplicative and separately processed from a non-duplicative received packet.

Alternatively, if the determination at decision block 806 is negative, the process moves to block 810 where the packet is identified as non-duplicative. The non-duplicative packet is subsequently employed for real time and/or non-real time monitoring of at least one flow that corresponds to the non-duplicative packet. Also, in at least one of the various embodiments, analysis of one or more aspects of the at least one monitored flow may be performed, e.g., statistics, metrics, quality of service, and the like. Next, the process returns to performing other actions.

Additionally, in at least one of the various embodiments, changes in packet header information for layer 4 of the OSI model may be employed in substantially the same way as discussed for layer 3 header information above. For example, an acknowledgment number value (instead of the TTL value) and the checksum value for a received packet's TCP/IP layer 4 packet header information could be masked to normalize the layer 4 packet header information. Further, the normalized layer 4 packet header information could then be hashed and compared to other previously determined hash values to identify the received packet as either duplicative or non-duplicative of a previously received packet.

Figure 9:
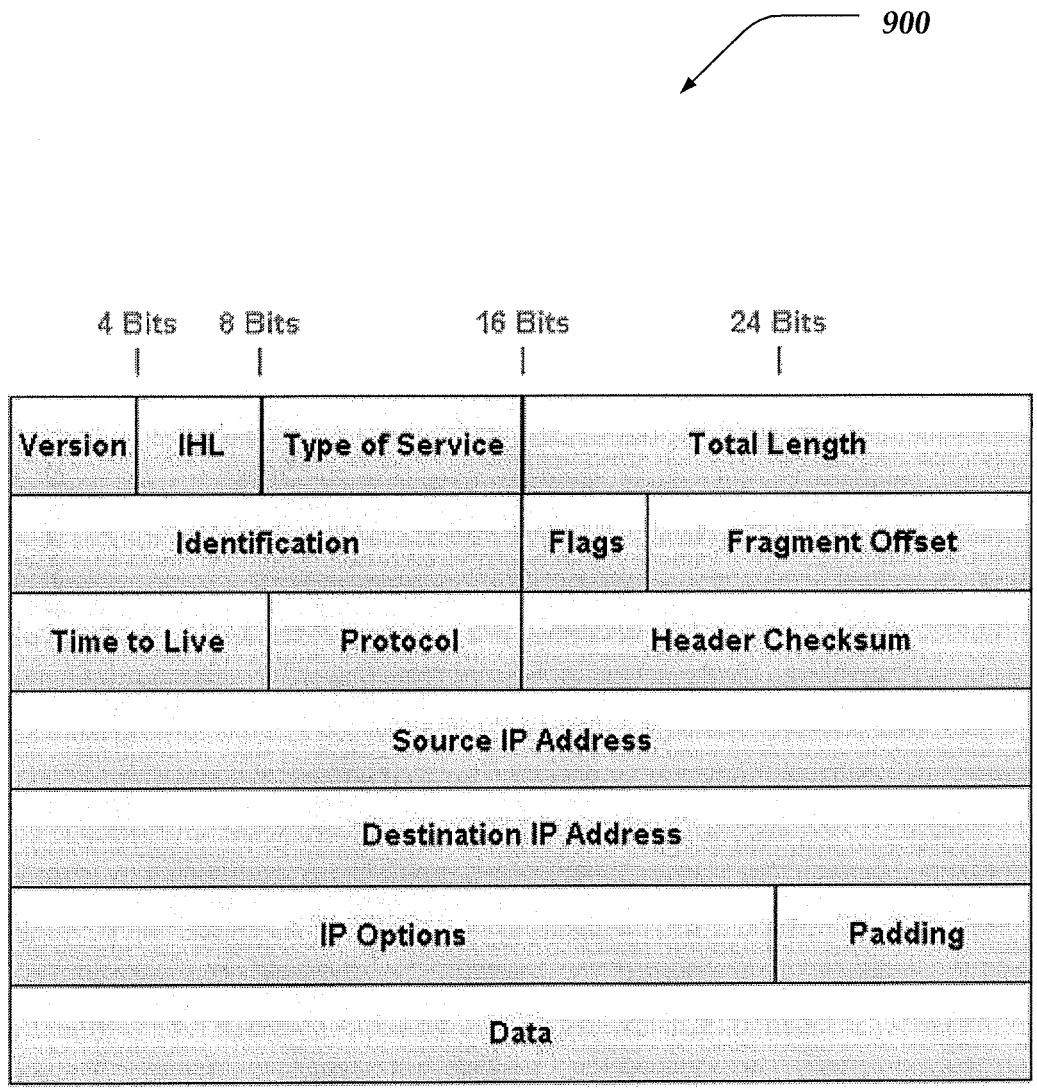
FIG. 9 shows an exemplary embodiment of an Internet Protocol (IP) packet in accordance with the invention.

FIG. 9 shows an exemplary embodiment of an Internet Protocol (IP) packet 900 in accordance with at least one of the various embodiments. As shown, packet 900 may contain a variety of information, including but not limited to version, type of service, total length, identification, flags, fragment offset, time-to-live, protocol, header checksum, source IP address, destination IP address, Padding and data. In at least one of the various embodiments, the source port address and destination address and sequence number may be employed in identifying a packet as corresponding to a monitored flow. However, there are many other aspects of a packet either singly or in combination with these elements that may also be used to identify a packet and its corresponding monitored flow.

What is claimed as new and desired to be protected by Letters Patent of the United States is:

1. A method for monitoring flows of packets over a network, wherein a network computer executing the method performs actions, comprising:
    employing the network computer to normalize Open Systems Interconnection (OSI) model information for layer 4 included in each header of each received packet, wherein normalizing layer 4 OSI model information by masking an acknowledgment number value and a checksum value for a header of the layer 4 OSI model information in each received packet;
    when at least a value based on the normalized layer information for a header of a packet is determined to be equivalent to another value based on normalized layer information for another header of another subsequently received packet, determining the other subsequently received packet as duplicative of the packet; and
    monitoring at least one flow of received packets, wherein each packet that is determined to be duplicative is processed separate from monitoring the at least one flow of received packets that are determined to be non-duplicative.

2. The method of claim 1, wherein determining the other subsequently received packet as duplicative, further comprises:
    hashing normalized layer 4 packet information for each received packet; and
    comparing the hashed layer 4 information of the packet and the other subsequently received packet.

3. The method of claim 1, wherein the separate processing of each duplicative packet further comprises at least one of counting each duplicative packet, tagging each duplicate packet, employing a lower priority for monitoring each duplicative packet than a non-duplicative packet, or disregarding the duplicative packet.

4. The method of claim 1, further comprising enabling a selection of one or more flows of packets for monitoring based on a correspondence of each selected flow of packets with at least one of an application, a node, or a network device.

5. The method of claim 1, further comprising displaying information regarding the monitored flow, including at least one of statistics, reports, or analysis of aspects of the monitored flow.

6. A network device for monitoring flows of packets over a network, comprising:
    a transceiver device for monitoring communication over the network;
    a memory device for storing at least instructions; and
    a processor device that is operative to execute instructions that enable actions, including:
        normalizing Open Systems Interconnection (OSI) model information for layer 4 included in each header of each received packet, wherein normalizing layer 4 OSI model information by masking an acknowledgment number value and a checksum value for a header of the layer 4 OSI model information in each received packet;
        when at least a value based on the normalized layer information for a header of a packet is determined to be equivalent to another value based on normalized layer information for another header of another subsequently received packet, determining the other subsequently received packet as duplicative of the packet; and
        monitoring at least one flow of received packets, wherein each packet that is determined to be duplicative is processed separate from monitoring the at least one flow of received packets that are determined to be non-duplicative.

7. The network device of claim 6, further comprising passively receiving packets communicated over at least one network.

8. The network device of claim 6, wherein determining the other subsequently received packet as duplicative, further comprises:
    hashing normalized layer 4 packet information for each received packet; and
    comparing the hashed layer 4 information of the packet and the other subsequently received packet.

9. The network device of claim 6, wherein the separate processing of each duplicative packet further comprises at least one of counting each duplicative packet, tagging each duplicate packet, employing a lower priority for monitoring each duplicative packet than a non-duplicative packet, or disregarding the duplicative packet.

10. The network device of claim 6, further comprising enabling a selection of one or more flows of packets for monitoring based on a correspondence of each selected flow of packets with at least one of an application, a node, or a network device.

11. The network device of claim 6, further comprising displaying information regarding the monitored flow, including at least one of statistics, reports, or analysis of aspects of the monitored flow.

12. A processor readable non-transitive storage media that includes instructions for monitoring flows of packets over a network, wherein a network device that executes at least a portion of the instructions enables actions, comprising:
    normalizing Open Systems Interconnection (OSI) model information for layer 4 included in each header of each received packet, wherein normalizing layer 4 OSI model information by masking an acknowledgment number value and a checksum value for a header of the layer 4 OSI model information in each received packet;
    when at least a value based on the normalized layer information for a header of a packet is determined to be equivalent to another value based on normalized layer information for another header of another subsequently received packet, determining the other subsequently received packet as duplicative of the packet; and
    monitoring at least one flow of received packets, wherein each packet that is determined to be duplicative is processed separate from monitoring the at least one flow of received packets that are determined to be non-duplicative.

13. The media of claim 12, wherein determining the other subsequently received packet as duplicative, further comprises:
    hashing normalized layer 4 packet information for each received packet; and comparing the hashed layer 4 information of the packet and the other subsequently received packet.

14. The media of claim 12, wherein the separate processing of each duplicative packet further comprises at least one of counting each duplicative packet, tagging each duplicate packet, employing a lower priority for monitoring each duplicative packet than a non-duplicative packet, or disregarding the duplicative packet.

15. The media of claim 12, further comprising enabling a selection of one or more flows of packets for monitoring based on a correspondence of each selected flow of packets with at least one of an application, a node, or a network device.

16. The media of claim 12, further comprising displaying information regarding the monitored flow, including at least one of statistics, reports, or analysis of aspects of the monitored flow.

17. A system for monitoring flows of packets over a network, comprising:
  a first network device that includes:
    a transceiver device for monitoring communication over the network;
    a memory device for storing at least instructions; and
    a processor device that is operative to execute instructions that enable actions, comprising communicating at least one flow of packets with at least a second network device; and
  a third network device that includes:
    a transceiver device for monitoring communication between the first network device and the second network device;
    a memory device for storing at least instructions; and
    a processor device that is operative to execute instructions that enable actions, comprising:
      normalizing Open Systems Interconnection (OSI) model information for layer 4 included in each header of each received packet, wherein normalizing layer 4 OSI model information by masking an acknowledgment number value and a checksum value for a header of the layer 4 OSI model information in each received packet;
      when at least a value based on the normalized layer information for a header of a packet is determined to be equivalent to another value based on normalized layer information for another header of another subsequently received packet, determining the other subsequently received packet as duplicative of the packet; and
      monitoring at least one flow of received packets, wherein each packet that is determined to be duplicative is processed separate from monitoring the at least one flow of received packets that are determined to be non-duplicative.

18. The system of claim 17, wherein the third network device enables further actions comprising passively receiving packets communicated over at least one network.

19. The system of claim 17, wherein determining the other subsequently received packet as duplicative, further comprises:
  hashing normalized layer 4 packet information for each received packet; and
  comparing the hashed layer 4 information of the packet and the other subsequently received packet.

20. The system of claim 17, wherein the separate processing of each duplicative packet further comprises at least one of counting each duplicative packet, tagging each duplicate packet, employing a lower priority for monitoring each duplicative packet than a non-duplicative packet, or disregarding the duplicative packet.

21. The system of claim 17, wherein the third network device enables further actions comprising enabling a selection of one or more flows of packets for monitoring based on a correspondence of each selected flow of packets with at least one of an application, a node, or a network device.

22. The system of claim 17, wherein the third network device enables further actions comprising displaying information regarding the monitored flow, including at least one of statistics, reports, or analysis of aspects of the monitored flow.

* * * * *